United States Patent
Vetro et al.

(10) Patent No.: US 7,860,158 B2
(45) Date of Patent: Dec. 28, 2010

(54) CODING CORRELATED IMAGES USING SYNDROME BITS

(75) Inventors: Anthony Vetro, Cambridge, MA (US); Jonathan S. Yedidia, Cambridge, MA (US)

(73) Assignee: Mitsubishi Electric Research Laboratories Inc., Cambridge, MA (US)

( * ) Notice: Subject to any disclaimer, the term of this patent is extended or adjusted under 35 U.S.C. 154(b) by 1062 days.

(21) Appl. No.: 10/929,050

(22) Filed: Aug. 27, 2004

(65) Prior Publication Data

US 2006/0045184 A1 Mar. 2, 2006

(51) Int. Cl.
*H04N 7/48* (2006.01)
*H04N 7/66* (2006.01)
*H04N 7/46* (2006.01)
*H04N 7/52* (2006.01)

(52) U.S. Cl. .............. 375/240; 375/240.03; 375/240.12

(58) Field of Classification Search ................ 375/240, 375/240.01
See application file for complete search history.

(56) References Cited

U.S. PATENT DOCUMENTS

| | | | |
|---|---|---|---|
| 4,191,970 A | 3/1980 | Witsenhausen et al. | |
| 5,633,682 A * | 5/1997 | Tahara | 375/240.23 |
| 6,160,846 A * | 12/2000 | Chiang et al. | 375/240.05 |
| 6,421,383 B2 * | 7/2002 | Beattie | 375/240.05 |
| 2001/0049804 A1 | 12/2001 | Arai | |
| 2004/0194008 A1 | 9/2004 | Garudadri et al. | |
| 2005/0031219 A1 | 2/2005 | Puri et al. | |
| 2005/0268200 A1 * | 12/2005 | Garudadri et al. | 714/746 |

OTHER PUBLICATIONS

Tudor, P.N. "MPEG-2 Video Compression Tutorial". _Electronics & Communication Engineering Journal_ (Dec. 1995): pp. 257-261.*
Aaron, A. et al. "Wyner-Ziv Coding of Motion Video". Presented at Asilomar Conference on Signals and Systems, Pacific Grove, California (Nov. 2002).*
Furht, B. et al. _Motion Estimation Algorithms for Video Compression_. Boston: Kluwer Academic Publishers, 1997, pp. 27-29, 57-60.*
Symes, P. _Digital Video Compression_. New York: McGraw-Hill, 2004, pp. 113-119.*
International Telecommunication Union. _ITU-T Reccomendation H.262_. 1995, pp. 85-86.*
Xu, Q. and Xiong, Z. "Layered Wyner-Ziv Video Coding". _Proc. of SPIE_ vol. 5308 (Feb. 2004): 83-91.*
Aaron, A., Rane, S.D., Setton, E. and Girod, B. "Transform Domain Wyner-Ziv Codec for Video". _Proc. of SPIE_ vol. 5308 (Feb. 2004): 520-528.*

(Continued)

*Primary Examiner*—Joseph G Ustaris
*Assistant Examiner*—David N Werner
(74) *Attorney, Agent, or Firm*—Dirk Brinkman; Gene Vinokur

(57) ABSTRACT

A method represents a correlated set of images. The correlation can be spatial or temporal. A lossy operation is applied to each image in the correlated set to generate a coarse image. The coarse image is encoded losslessly to yield an encoded coarse image. Each image is also represented by syndrome bits. The combination of the encoded coarse images and the syndrome bits represent the correlated set of images.

34 Claims, 10 Drawing Sheets

OTHER PUBLICATIONS

Aaron, A., Zhang, R. and Girod, B. "Wyner-Ziv Coding of Motion Video". _Conf. Rec. of the Thirty-Sixth Asilomar Conf. on Signals, Systems, and Computers 2002_ vol. 1 (Nov. 2002): 3-6.*

ITU-T Recommendation H.264, May 2003.*

Wiegand, T.; Sullivan, G.J.; Bjontegaard, G.; Luthra, A., "Overview of the H.264/AVC video coding standard," Circuits and Systems for Video Technology, IEEE Transactions on , vol. 13, No. 7, pp. 560-576, Jul. 2003.*

Elgammal, A., Harwood, D., and Davis, L. "Non-parametric Model for Background Subraction". _Proc. of the 6th European Conf. on Comp. Vision—Part II_ (Jul. 2001_: pp. 751-767.*

Aaron A et al: "Transform-domain Wyner-Ziv codec for video" Proceedings of the SPIE—The International Society for Optical Engineering SPIE-Int. Soc. Opt. ENG USA, vol. 5308, No. 1, Jan. 2004, pp. 520-528.

Chen J et al: "Distributed source coding using serially-concatenated-accumulate codes" 'Online! Aug. 1, 2004, pp. 1-8.

Min Wu et al: "A Study of Encoding and Decoding Techniques for Syndrome-Based Video Coding" Circuits and Systems, 2005. ISCAS 2005. IEEE International Symposium on Kobe, Japan May 23-26, 2005, Piscataway, NJ, USA, IEEE, May 23, 2005, pp. 3527-3530.

S.S. Pradhan and K. Ramchandran, "Distributed Source Coding Using Syndromes (DISCUS): Design and Construction," IEEE Transactions on Information Theory, vol. 49, pp. 626-643, Mar. 2003.

Puri and Ramchandran, "PRISM: A New Robust Video Coding Architecture Based on Distributed Compression Principles," Proc. 40th Allerton Conference on Communication, Control and Computing, Oct. 2002.

Aaron, et al., in "Towards practical Wyner-Ziv coding of video," Proc. IEEE International Conference on Image Processing, Sep. 2003.

J. Li, K.R. Narayanan, and C.N. Georghiades, "Product Accumulate Codes: A Class of Codes With Near-Capacity Performance and Low Decoding Complexity," IEEE Transactions on Information Theory, vol. 50, pp. 31-46, Jan. 2004.

D. Divsalar and S. Dolinar, "Concatenation of Hamming Codes and Accumulator Codes with High Order Modulation for High Speed Decoding," IPN Progress Report 42-156, Jet Propulsion Laboratory, Feb. 15, 2004.

* cited by examiner

900

CODING CORRELATED IMAGES USING SYNDROME BITS

RELATED APPLICATION

This Patent Application is related to U.S. patent application Ser. No. 10/928,448 Compressing signals using serially-concatenated accumulate codes filed by Yedidia et al., on Aug. 27, 2004, and incorporated herein by reference.

FIELD OF THE INVENTION

The invention relates generally to image coding, and more particularly to encoding and decoding correlated images with syndrome bits.

BACKGROUND OF THE INVENTION

Conventional image and video coding schemes, such as schemes according to the MPEG and ITU series of video coding standards, are well suited for broadcast video and stored media distribution in which there are a huge number of low-complexity receivers (TVs) with decoders, but only a few high-complexity transmitters with encoders.

With such video distribution models, computationally demanding motion estimation techniques are employed in the encoder to exploit temporal correlation among video frames. That process of exploiting temporal redundancy before transmission yields excellent compression efficiency.

FIG. 1 shows a conventional encoder 100 with motion estimation 110. An input video 101 is processed one block at a time. A motion estimator 110 determines a best matching block of a reference frame stored in a frame memory 111 for a current block to be encoded. This best matching block serves as a prediction of the current block. A corresponding motion vector 112 is entropy encoded 150. A difference 120 between the current block of the input video and the predicted block 121, which is generated by a motion-compensated predictor 130, is obtained. The difference signal then undergoes a transform/quantization process 140 to yield a set of quantized transform coefficients 141. These coefficients are entropy encoded 150 to yield a compressed bitstream 109. Performing an inverse transform/quantization 160 on the quantized transform coefficients 121 and adding 170 this result to the motion compensated prediction 121 generates the reference frame, which is stored in the frame memory 111 and used for predicting 130 of successive frames of the input video 101. The output bitstream 109 is generated based on the entropy encoding 150 of motion 112 and texture 141 information.

FIG. 2 shows a conventional decoder 200. An input bitstream 201 is first subject to an entropy decoder 210 that yields both quantized transform coefficients 211 as well as corresponding motion vectors 212. The motion vectors are used by a motion compensated predictor 220 to yield a prediction signal 221. The quantized transform coefficients 211 are inverse transform/quantized 230 and added 240 to the prediction signal 221 to yield the reconstructed video 209. Frames of the reconstructed video, which are used for decoding successive frames, are stored to a frame memory 250.

The above scheme achieves excellent compression efficiency, but has considerable processing and power costs, which is not a problem in large scale commercial applications, such as film and broadcast studios with nearly unlimited resources. However, there are an increasing number of applications in which the capture and encoding of images and video is done with devices that have limited battery and processing power, and limited storage and bandwidth, e.g., cellular telephones, PDAs, environmental sensors, and simple digital cameras with severely limited processing, storage and power resources. Typically, these devices use simple a microprocessor or microcontrollers, and batteries.

Therefore, there is a need for a low complexity encoder, which can provide good compression efficiency and high quality images at an encoder. This paradigm shift in video application needs for video compression is described by R. Puri and K. Ramchandran in "PRISM: A New Robust Video Coding Architecture Based on Distributed Compression Principles," Proc. 40th Allerton Conference on Communication, Control and Computing, October 2002. In this work they apply to video coding the syndrome encoders and decoders, based on trellis codes, that were previously developed by S. S. Pradhan and K. Ramchandran, "Distributed Source Coding Using Syndromes (DISCUS): Design and Construction," IEEE Transactions on Information Theory, Vol 49, pp. 626-643, March 2003.

FIG. 3 shows such a prior art low complexity PRISM encoder 300. An input video 301 is classified 310. The classifier estimates a degree of spatio-temporal correlation for each block in a current frame. Based on a squared error difference between the block to be encoded and the co-located block in a previous encoded frame, a class is determined. For instance, a 'SKIP' class indicates that the correlation is very high and the current block does not need to be encoded at all, while an 'INTRA' class indicates that the correlation is very low and the current block is best encoded using a conventional intra-coding scheme. For correlations between these two extremes, the prior art describes a syndrome-based coding scheme. The idea of syndrome-based coding dates back to 1974, see A. D. Wyner, "Results in the Shannon Theory," IEEE Transactions on Information Theory, vol. 20, pp. 2-10, 1974.

In the next step, a block transform 320, such as a discrete cosine transform (DCT), is applied to decorrelate the data. The transform coefficients are then subject to a zig-zag scan 330 to order the coefficients into a ID vector of decreasing energy.

A small fraction of the coefficients, which correspond to low-frequency coefficients 331, e.g., approximately 20% of the total coefficients, are subject to a base quantization 340. The quantized coefficients are then input to a syndrome encoder 370 to produce syndrome bits 371. In that particular scheme, a ½-rate trellis code is used for the syndrome coding. A refinement quantization 360 is performed to achieve a target quality for the coefficients that have been syndrome encoded. This operation is just a progressive sub-dividing of the base quantization interval into intervals of size equal to the target quantization step size, where an index 361 of the refinement quantization interval inside the base quantization interval is eventually transmitted to a decoder.

A large fraction of the coefficients, which correspond to higher-frequency coefficients 332, e.g., the remaining 80% of coefficients, are subject to a conventional intra coding, in which the coefficients are subject to conventional quantization 350 and entropy encoding 380 operations as described above.

In addition to the above, a cyclic redundancy check (CRC) of the quantized codeword sequence is calculated by CRC generator 390 to produce CRC bits 391, which are also sent to the decoder. The CRC bits 391 are used at the decoder to determine the best predictor among several candidate predictors. The CRC bits 391 are combined 399 with the outputs from blocks 360, 370, and 380 to produce the output bitstream 309.

FIG. 4 shows the corresponding decoder 400. After deinterleaving 410 an input bitstream 401, the decoder performs motion estimation 405, which outputs a predictor 407 consisting of spatially shifted pixels from the frame memory 406. Multiple predictors with different spatial shifts are generated. A syndrome decoder 440 generates a sequence of quantized coefficients based on the received syndrome bits for each predictor. Because the syndrome encoding is based on trellis codes, a Viterbi process is used to identify the sequence of coefficients that is nearest to the candidate predictor. If the decoded coefficients match the CRC by means of the CRC check 445, then the decoding is declared to be successful. Given the decoded (syndrome) coefficients and the index of the refinement quantization interval sent by the encoder, the inverse base quantization and refinement 420 can be performed to yield a reconstructed set of low-frequency coefficients. The higher-frequency coefficients are recovered through an entropy decoding 450 and inverse quantization operation 460. Both sets of coefficients are then subject to the inverse scan 430 and inverse block transform 470 to yield the reconstructed video 409. The reconstructed frames 408 are also stored into frame memory 406 for the decoding of successive frames.

There are several disadvantages with the above scheme. First, a majority of the transform coefficients, i.e., the high-frequency coefficients, are encoded using conventional quantization 350 and entropy encoding 380 techniques. Complex scenes contain a substantial amount of high-frequency information. Therefore, the prior art scheme has a considerable amount of overhead and leads to loss of efficiency. Second, the prior art syndrome encoding is based on relatively small 8×8 blocks, which decreases an overall rate of compression. Third, the CRC needs to be sufficiently 'strong' to reliably reflect the coefficients. Not only is this an overhead for every block, but also, there is no guarantee that the decoding will perform correctly.

Another coding scheme is described by Aaron, et al., in "Towards practical Wyner-Ziv coding of video," Proc. IEEE International Conference on Image Processing, September 2003. That schema can operate in the pixel or transform domain.

As shown in the prior art encoder 500 of FIG. 5, an input video 501 is partitioned, using a switch 510, into two types of frames: key-frames 511 and Wyner-Ziv frames 512. The key frames are regularly spaced frames. These frames are encoded using conventional intra-frame encoding 520, e.g., DCT, quantization and entropy coding, and coded at the target quality level. The Wyner-Ziv frames 512 are subject to a scalar quantization 513 and a turbo encoder 530, which is one form of syndrome coding. The output bitstream 509 is a combination 540 of bits corresponding to both encoded key-frames and Wyner-Ziv frames. It is noted that in that prior art scheme, syndrome bits are generated only for Wyner-Ziv frames, and not for key-frames, and the intra-encoding is conventional, i.e., both low and high frequency coefficients are encoded.

FIG. 6 shows corresponding prior art decoder 600. The input bitstream 601 includes encoded key-frames and Wyner-Ziv frames. The encoded key frames are decoded using an intra-frame decoder 610 to yield a reconstructed key-frame 611, while the Wyner-Ziv frames are first subject to a turbo decoder 620 to yield a set of syndrome coefficients, which then undergo a reconstruction process 630 to yield the final reconstructed video 609 using the switch 660. The reconstruction is based on the coefficients output by the turbo decoder, as well as interpolated 640 frame data. The reconstructed Wyner-Ziv and key-frames are stored into a frame memory 650 for the decoding of successive frames.

The two main disadvantages of that scheme are the overhead introduced in sending high-quality key-frames, as well as a delay incurred by sending future key-frames that are required for decoding past frames. In terms of conventional coding schemes, the key frames are I-frames and the Wyner-Ziv frames are analogous to B-frames. As with other conventional coding schemes, a distance between the I-frames indicates the amount of the delay. Assuming that a high delay can be tolerated, placing key frames further apart lowers the amount of overhead. However, doing so also lowers the quality of the interpolation, which, in effect, lowers the overall coding efficiency because more syndrome bits are needed to recover from errors in the interpolation.

Clearly, it is desirable to have a coding scheme with low encoding complexity, i.e., similar to intra-only coding, but with high coding efficiency, i.e., closer to that of the best inter-frame coding schemes, that overcomes the disadvantages of the prior art.

SUMMARY OF THE INVENTION

A system and method represents a correlated set of images. The correlation can be spatial or temporal. A lossy operation is applied to each image in the correlated set to generate a coarse image. The coarse image is encoded losslessly to yield an encoded coarse image. Each image is also represented by syndrome bits. The combination of the encoded coarse images and the syndrome bits represent the correlated set of images.

In a typical application, the lossy operation is a coarse quantization applied to either pixel values or transform coefficients of the image. Alternatively, the operation can be a sub-sampling or a wavelet transform.

The encoded coarse images can later be decoded to obtain evidence. The evidence and the syndrome bits are sufficient to reconstruct the correlated set of images.

DETAILED DESCRIPTION OF THE PREFERRED EMBODIMENT

Our invention provides a system and method representing a set of correlated images using syndrome bits. The images can be correlated in space, time or both. An example set of temporally correlated images is a video. A set of spatially correlated images can include stereo images. For temporally correlated images, motion between the images over time is of concern. For spatially correlated images, disparity in space is of concern. The representation according by the invention can be generated by an encoder. The representation can be decoded to recover the original correlated images.

In an encoder, a lossy operation is applied to each image to generate a coarse image for each correlated input image of the set. The lossy operation can be a sub-sampling, a low-frequency filtering, a reduction in resolution, a reduction in intensity values, and the like. For example, the coarse operation only considers low frequency components of each input image. This representation of the coarsely encoded image can be produced in several different ways. For example, it can be produced by applying a coarse quantization scale to input pixels or transform coefficients. The quantization process typically removes or suppresses the high-frequency components of the image signal. Alternatively, the image data could be sub-sampled to effectively remove higher frequency data. The reduction in spatial resolution is essentially equivalent to computing the low subband data that is typical in wavelet-based decompositions. However, any known finite-impulse response (FIR) filters with low-pass frequency response may also be used. The invention does not encode high frequency components of the input images. After the coarse image is obtained, the coarse image can be encoded losslessly using, e.g. a variable length coding (VLC). Syndrome bits are also generated for each correlated input image in the set.

Therefore, in the representation according to the invention, each image in the correlated set is represented by an encoded coarse image and syndrome bits. At this time it is possible to store the encoded images for later processing, or the encoded images can be transmitted.

A decoder performs motion estimation between the encoded coarse images to provide evidence for a syndrome decoder to yield a set of reconstructed images using the syndrome bits.

Encoder

Figure 7:
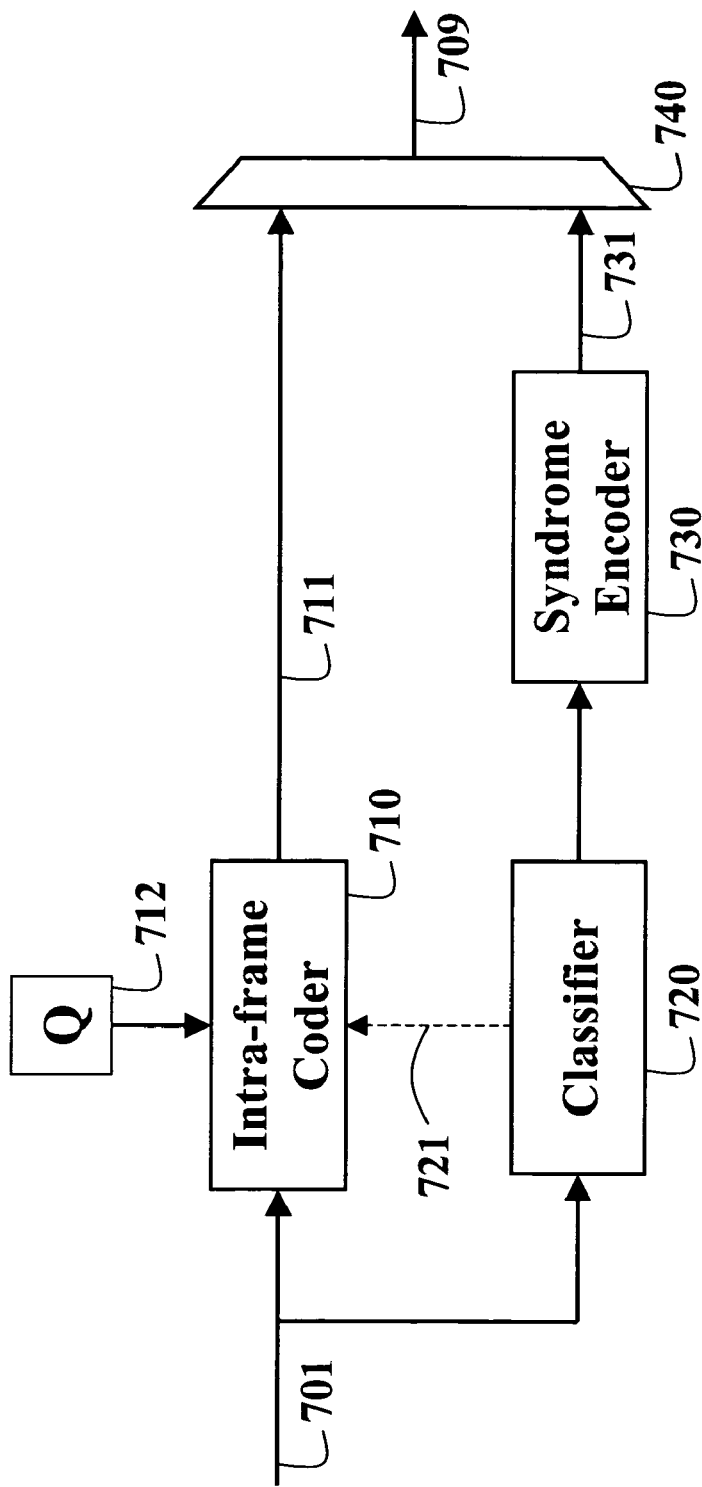
FIG. 7 is a block diagram of a video encoder using syndrome coding according to the invention.

FIG. 7 shows an encoder 700 according to the invention. The encoder applies a lossy operation to each input image 701 of the correlated set of images, e.g., a video, to generate a coarse image 711. For example, an intra-frame encoder 710 uses a coarse quantization Q 712 to keep a bit rate to a minimum or at a predetermined target rate. The coarse quantization may vary from one image to another to keep the rate constant, or it may be kept constant for each image to keep the distortion constant. Other ways that the coarse encoded image can be produced include first reducing the spatial resolution of the image, and then quantizing the spatially reduced image data. Standard coders with intra-coding capability could be used for this purpose such as the JPEG, MPEG or H.26x series of codecs.

A 'coarse' image can mean that the encoding only considers low frequency components in each image, while high frequency components are substantially ignored. For example, consider an encoder with quantization scale in the range of 1-31. Without sub-sampling, a coarse quantization scale 712 is in the upper third (20-31) of the range. When sub-sampling is applied, much of the high-frequency components of the image are similarly lost in this process. As a result, the coarse encoding is not only determined by the quantization scale, but also the frequency response (low-pass characteristics) of the filter that has been applied to achieve the reduced resolution (coarse) image. Because the high-frequency components are suppressed by this filtering process, the quantization scale may be outside the range that is typically associated with a coarse quantization scale. In terms of a peak signal-to-noise ratio, the PSNR of the coarse image 711 would typically be in the range of 22-29 dB depending on picture coding complexity, whereas a conventional encoding would result in an average image quality of about 32-34 dB, which is the usual range for consumer video, e.g., broadcast digital television. It should be noted that other ways to produce lower resolution images are known. Then coarse image is encoded losslessly using any known technique.

Each input image is also classified 720. The classifier has the following functions. First, the classifier determines a target bit rate at which a syndrome encoder 730 operates to generate syndrome bits 731. Second, the classifier 720 determines 721 whether the encoding of certain blocks in the input image can be skipped, i.e., if the current block is substantially similar to the block at the same location in the previous input image. Only if the blocks are substantially different is the block encoded. The encoded coarse images 711 and the syndrome bits 731 are combined 740 to form the output bitstream 709 of the representation of the correlated set of images according to the invention.

If there is a feedback channel from the decoder to the encoder, then the decoder can provide information to determine the number of syndrome bits 731. In this case, the encoder can transmit a small number of syndrome bits, and then find out from the feedback information whether the decoding was successful, or whether more syndrome bits need to be sent. For this strategy to be efficient, it is important that the syndrome encoder and syndrome decoder work in an incremental fashion; i.e., when more syndrome bits are transmitted, the information in the previously transmitted syndrome bits are not being wasted. The syndrome encoder and decoder according to the invention have this incremental property.

Figure 8:
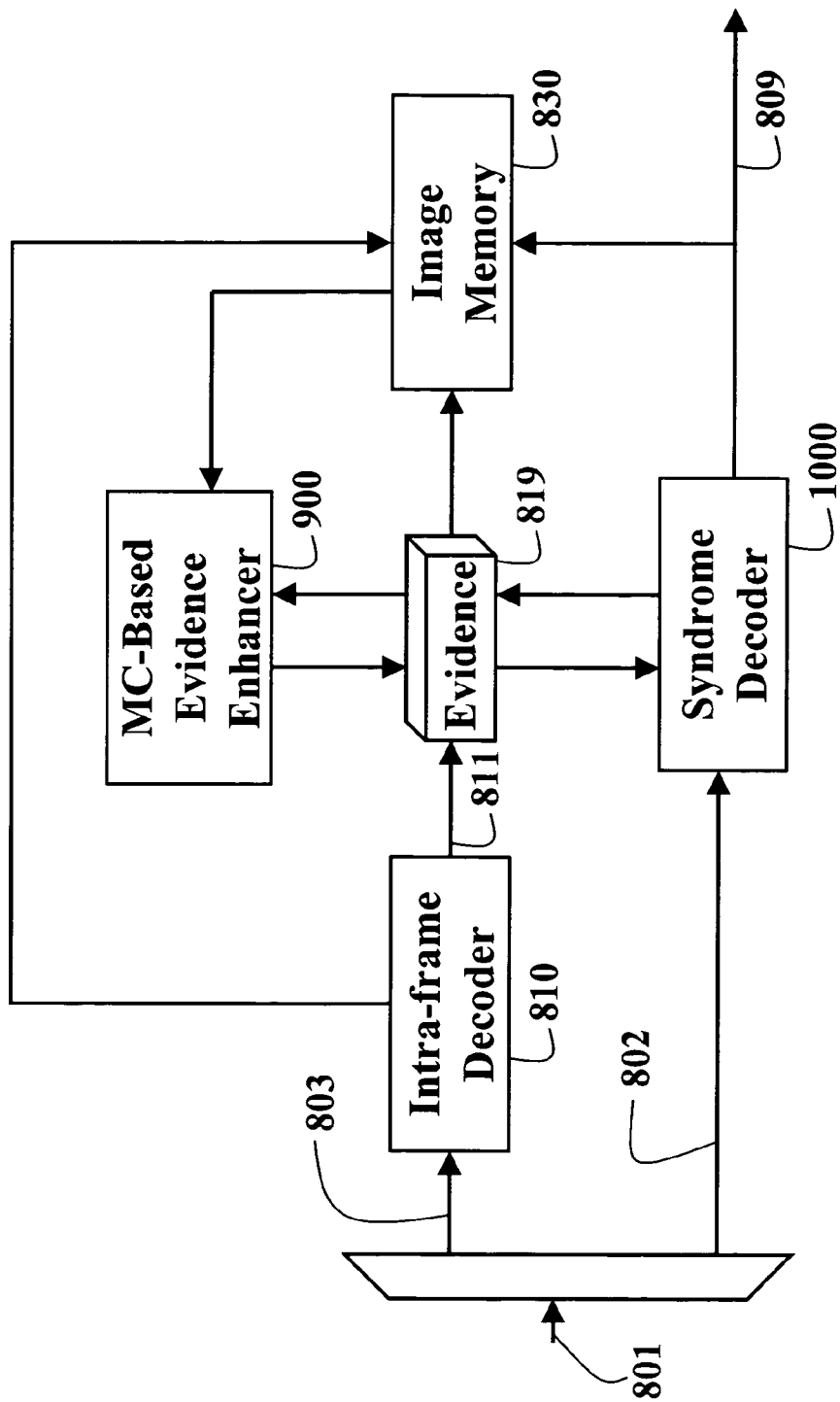
FIG. 8 is a block diagram of a video decoder corresponding to the encoder of FIG. 7.

As shown in FIG. 8 for a decoder 800 according to the invention, an intra-frame decoder 810 reconstructs a decoded coarse image 811 for each encoded coarse image 803 in the input bitstream 801. The coarse-quality images serve as evidence 819 for a syndrome decoder 1000. Also, the decoded coarse images 811 serve as a basis for performing, in the motion-compensated evidence enhancer 900, motion estimation with respect to other coarse images to be decoded later. Note, in the case that the correlation is spatial, and the motion estimation is replaced by disparity estimation. That is, the relative displacement of the images in space is computed, instead of the displacement in time. There exist several known techniques for determining how adjacent images are offset from each other.

Therefore, the coarse image 811 is stored in an image memory 830. Next, the evidence 819 is improved by means of a motion-compensated (MC) evidence enhancer 900. The improved evidence replaces the initial evidence. The evidence can also be stored into the image memory 830. The syndrome decoder 1000 generates the reconstructed set of correlated images 809 based on the evidence and the received syndrome bits 802.

Syndrome Encoder

The syndrome encoder 730 generates the syndrome bits 731. The invention uses codes derived from so-called "repeat-accumulate codes," namely "product-accumulate codes," and codes that we call "extended Hamming-accumulate codes." We refer generally to these as serially concatenated accumulate codes (SCA). For more information on these classes of codes, see J. Li, K. R. Narayanan, and C. N. Georghiades, "Product Accumulate Codes: A Class of Codes With Near-Capacity Performance and Low Decoding Complexity,"

IEEE Transactions on Information Theory, Vol. 50, pp. 31-46, January 2004; M. Isaka and M. Fossorier, "High Rate Serially Concatenated Coding with Extended Hamming Codes," submitted to IEEE Communications Letters, 2004; and D. Divsalar and S. Dolinar, "Concatenation of Hamming Codes and Accumulator Codes with High Order Modulation for High Speed Decoding," IPN Progress Report 42-156, Jet. Propulsion Laboratory, Feb. 15, 2004.

The co-filed patent application by Yedidia et al., incorporated herein by reference, describes the operation of the syndrome encoder based on SCA codes. Such an encoder has a number of features. The syndrome encoder operates on integer-valued inputs, such as intensity values of pixels. The syndrome encoder can operate at very high compression rates. The syndrome encoder is rate-adaptive, and can operate in an incremental fashion, sending more syndrome bits as necessary without wasting information in syndrome bits sent previously.

It is important to note that the syndrome encoder only has to perform very simple operations, i.e., generating the syndromes bits, and thus has a very low complexity.

Syndrome Decoder

Figure 10:
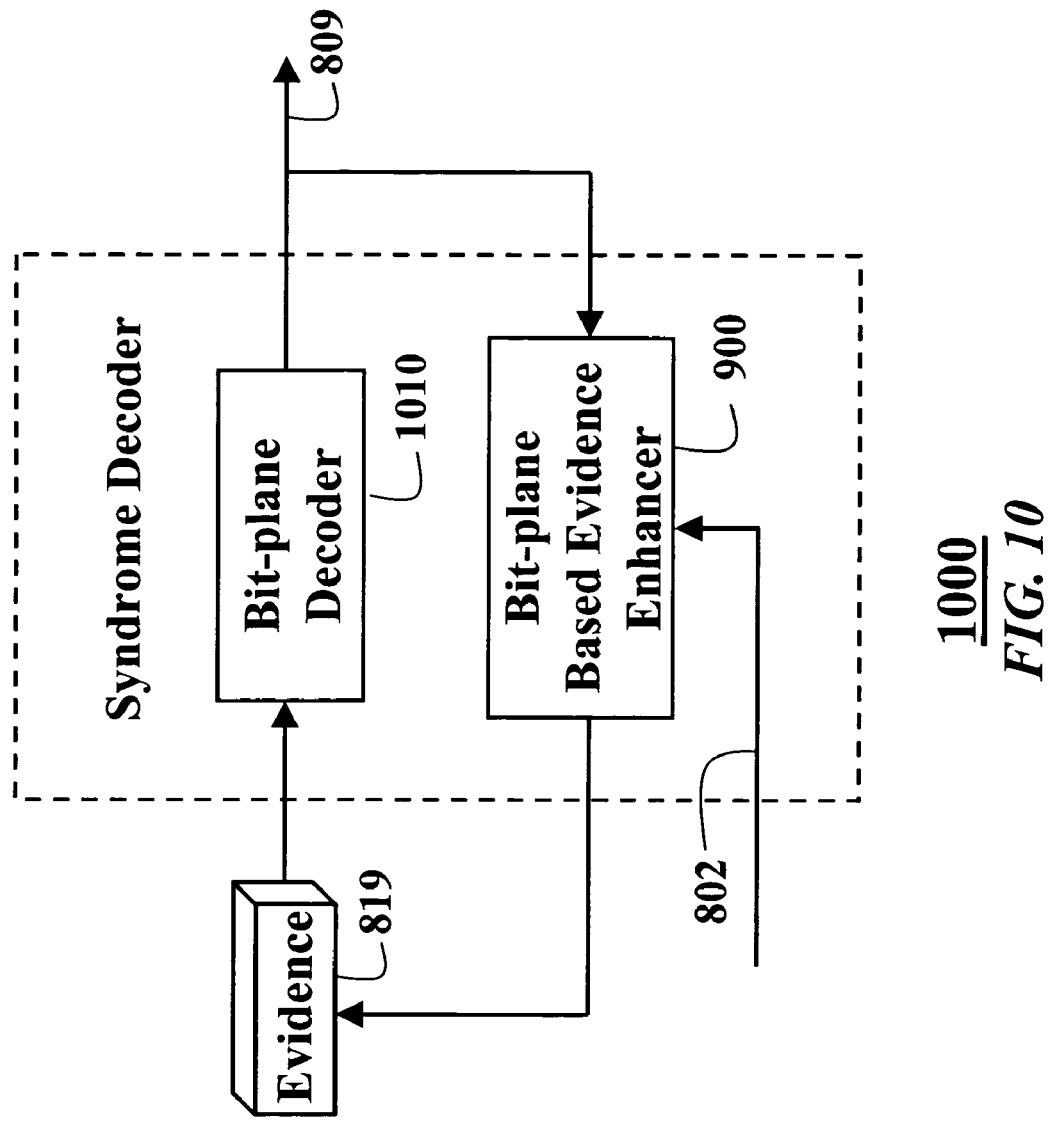
FIG. 10 is a block diagram of a syndrome decoder according to the invention.

As shown in FIG. 10, the syndrome decoder 1000 takes as input the encoded syndrome bits 802, and the evidence 819 from previously decoded images. The evidence is based on a probability distribution of the possible pixel intensity values in the current image to be decoded, given the decoded intensity values in previously decoded images. Evidence is provided to the syndrome decoder as either a complete probability distribution for each pixel, or the evidence is represented by sufficient statistics of a distribution. In the case of a Gaussian distribution, the mean and variance of each pixel is sufficient to describe the distribution.

The syndrome decoder decodes each encoded coarse image using a multi-stage bit-plane decoder 1010. After each bit-plane is decoded, a priori probabilities for the bits in the next bit plane are determined using the evidence 819, conditioned on results in the decoded bit-planes. The bit plane decoder 1010 is a soft-input decoder for the SCA code. As described in more detail in the related patent application, the syndrome decoder 1000 can operate close to information-theoretic limits, with acceptable complexity.

MC-Based Evidence Enhancer

Figure 9:
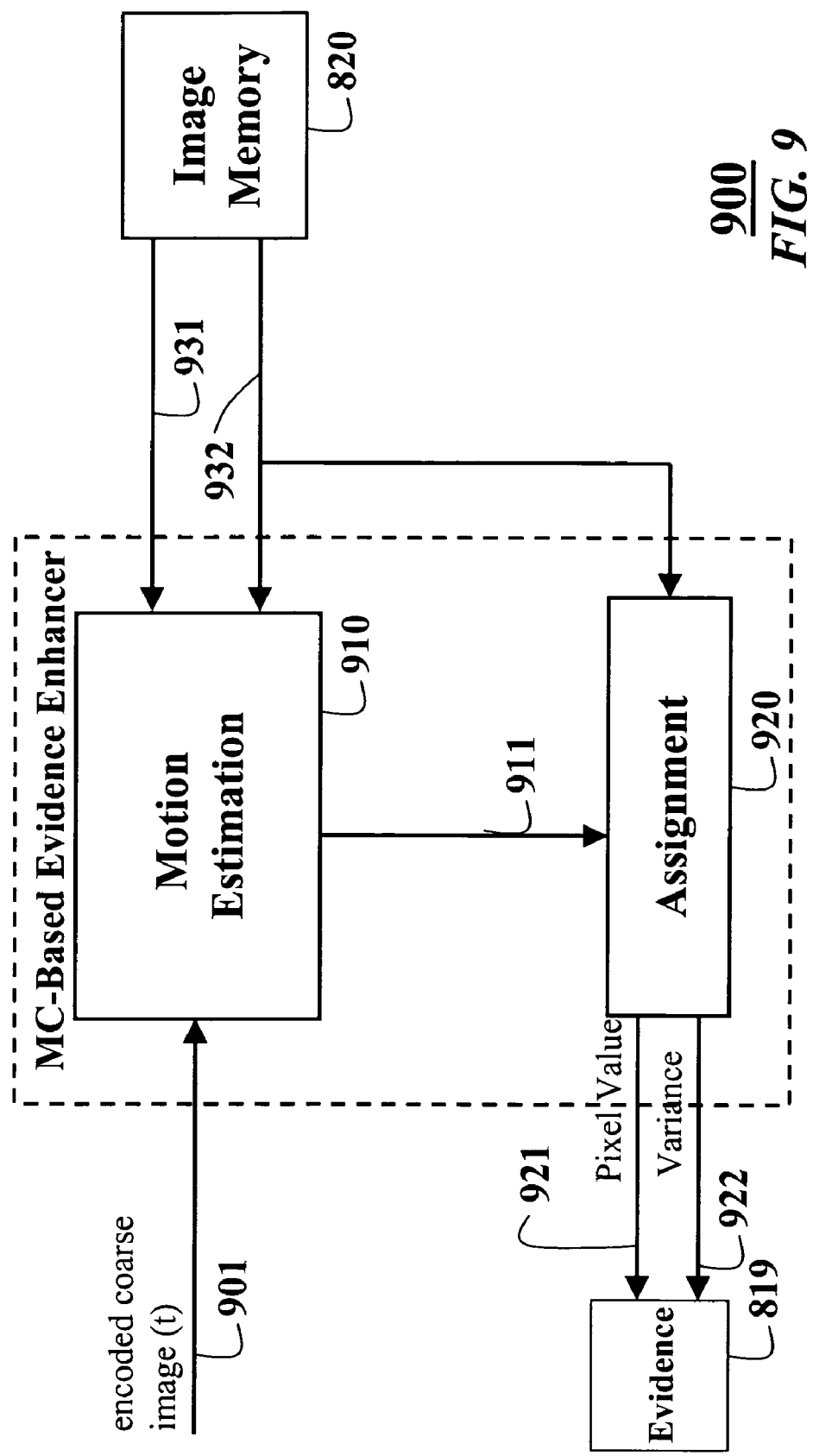
FIG. 9 is a block diagram of a motion-compensated evidence enhancer according to the invention.

As shown in FIG. 9, the MC-based evidence enhancer 900 improves the quality of the evidence 819 used by the syndrome decoder 1000. As the evidence improves, fewer syndrome bits are required to reconstruct the output image 809. The enhancer 900 also provides the syndrome decoder 1000 with a measure of confidence for each pixel intensity value 921 in the improved evidence, e.g., a variance 922. This allows a soft decoding, as described above, to be applied in the reconstruction process, which typically enables higher compression rates.

The operation of the MC-based evidence enhancer 900 is as follows. Motion estimation 910 first determines, for each block or pixel, a correspondence between the current encoded coarse image 901 and some selected previously processed image available to the decoder from an image memory 820. We call this selected image an anchor image. The set of previously decoded images can include both decoded coarse images 931 and fully reconstructed images 932. The search for the best anchor image can be performed on blocks or pixels.

Resulting motion vectors 911 are provided to an assignment module 920, which determines the pixel intensity value 921, and corresponding variance 922, for each pixel in the current image, which becomes the evidence 819 for decoding the next image.

Conventional prior art coding schemes always estimate motion vectors in the encoder and then transmit the motion vectors. In contrast, we estimate motion vectors in the decoder. Therefore, there is no rate overhead caused by estimating the motion at a relatively fine scale. We note that depending on a quality of the current image, the best correspondence can be found in either the decoded coarse images 931 or the fully reconstructed images 932, or they can be used in conjunction with one another.

Note again, the selection of the anchor image can be done on a block-by-block basis for each block in the current image. There are many search criteria that can be applied for the motion estimation 910. In a block-based search, typical measures include a sum of absolute difference (SAD) between the current block and the candidate block. In a pixel-based search, methods that solve the classic optical flow equations can be applied. In either case, the motion vectors can be regularized so that the resulting estimated motion vectors have some degree of smoothness. Metrics that combine the result of searching coarse and fully reconstructed images can also be used.

As stated above, the primary goal of the motion estimation process is to determine a best correspondence in previously decoded images so that the evidence 819 provided by the current image is ultimately enhanced. Given the motion vectors for a pixel or block, the corresponding pixel values in the reconstructed image are assigned 920 as the pixel values for the current image 901 to obtain the reconstructed image 809.

In the event that a suitable match cannot be found, alternate strategies can be employed, e.g., a zero motion vector can be assigned to indicate that the co-located block of the anchor image is used. Alternatively, the intra-coded image can be enhanced using conventional image processing techniques, such as sharpening edges.

The assigned variance 922 also enables soft decoding by the syndrome decoder 1000. One means to assign the variance is based on a measure employed in the search process, such as the SAD terms in the case of a block-based search. For instance, a large SAD assigns a higher variance, while a small SAD assigns a lower variance.

Comparison to Prior Art

Figure 1:
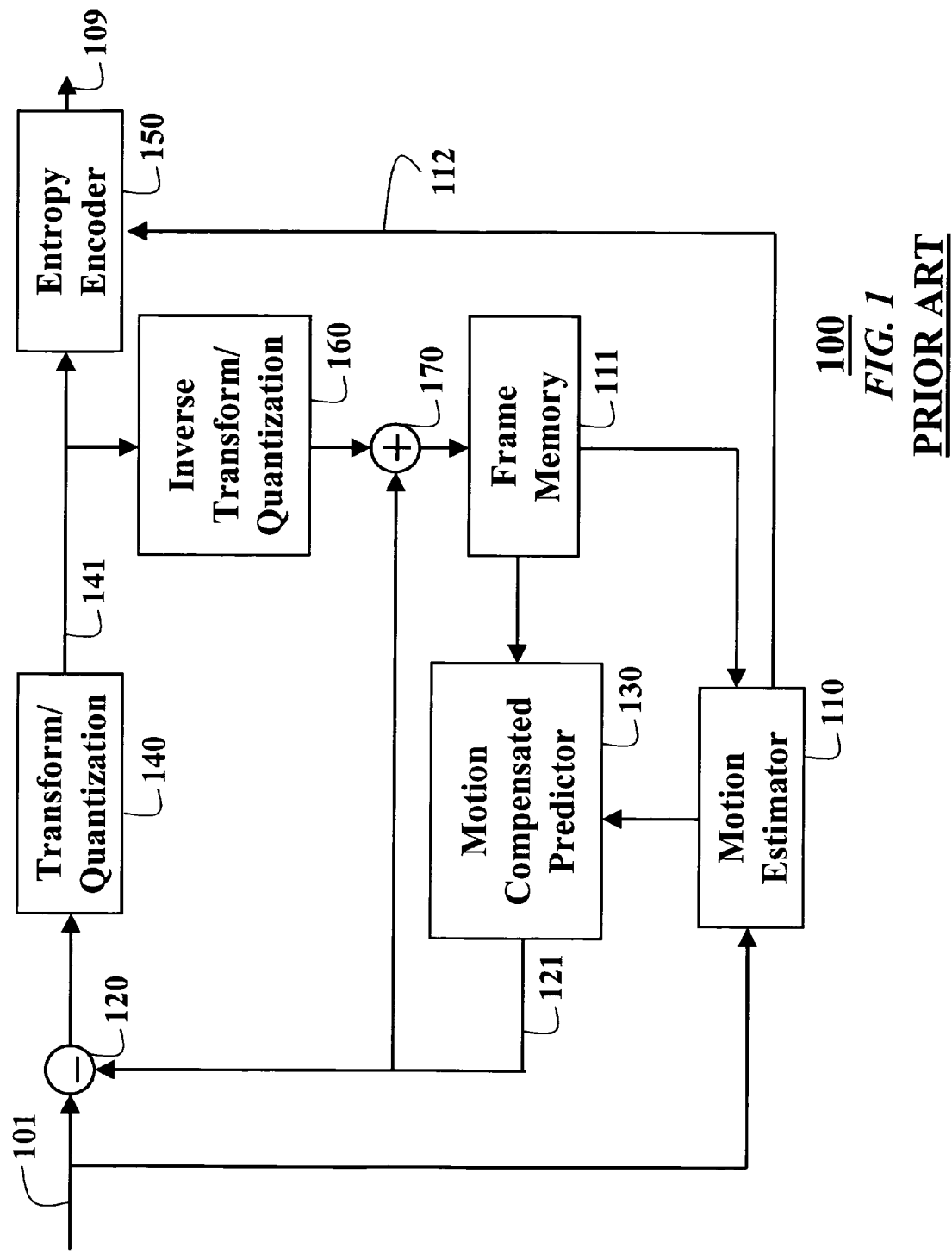
FIG. 1 is a block diagram of a prior art video encoder using conventional motion estimation and transformation techniques.
Figure 2:
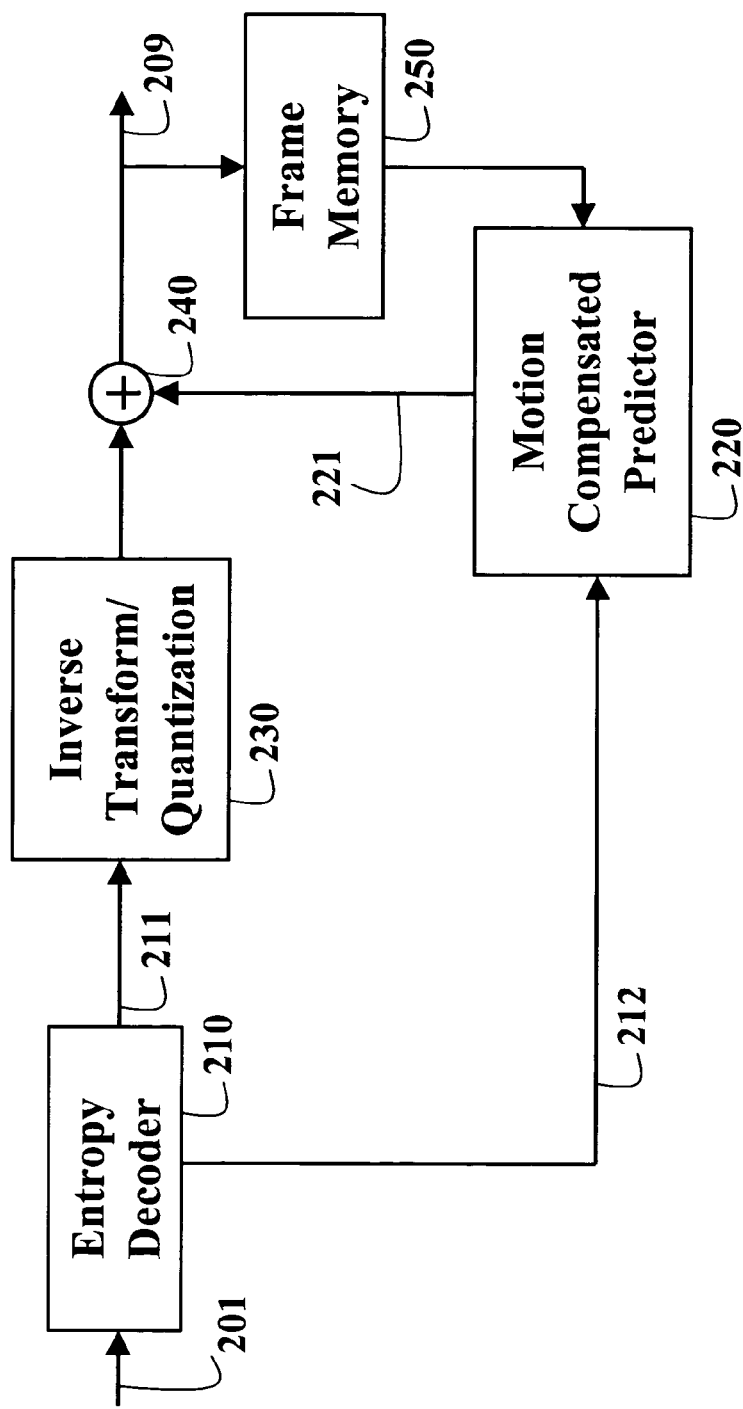
FIG. 2 is a block diagram of a prior art video decoder corresponding to the encoder of FIG. 1.
Figure 3:
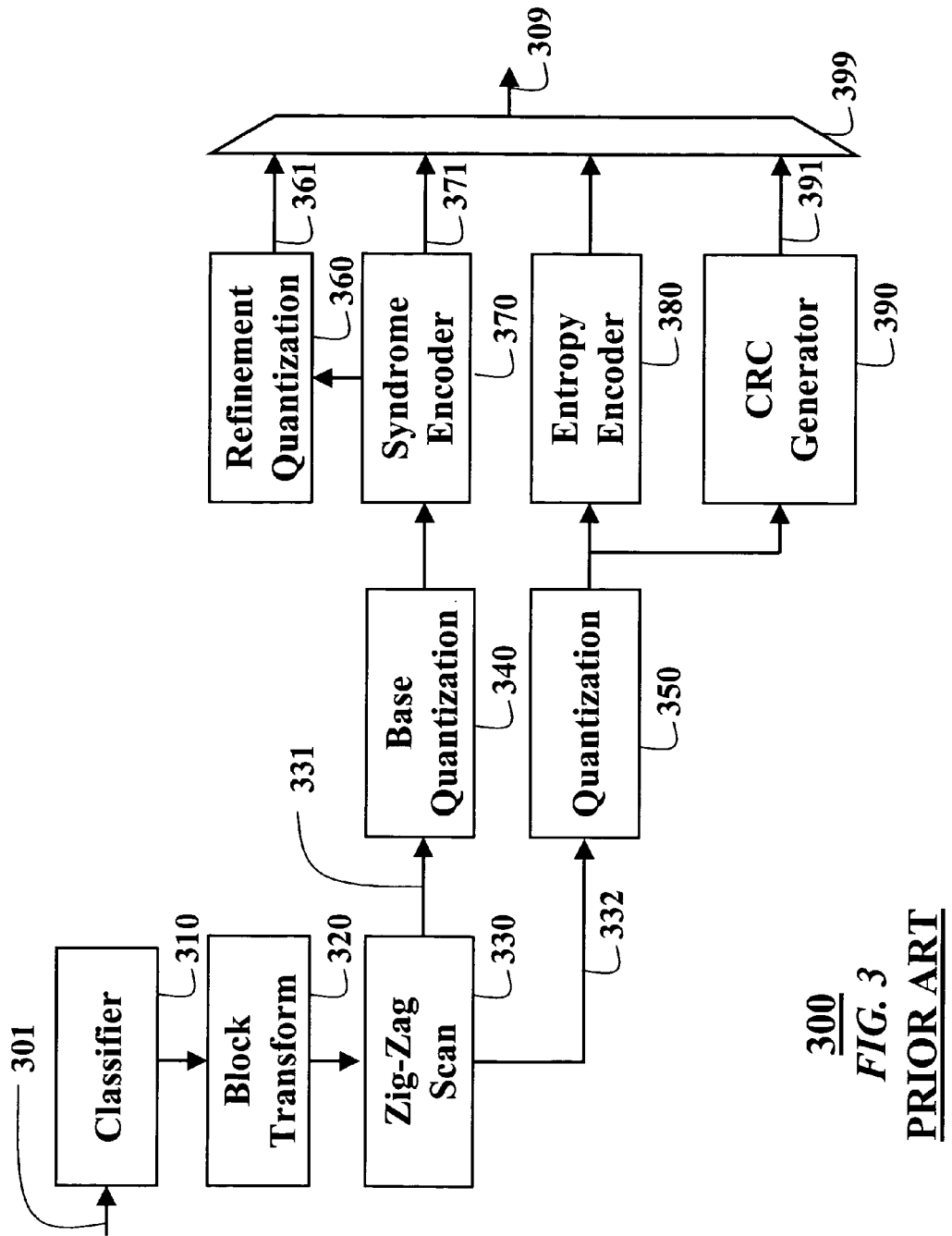
FIG. 3 is a block diagram of a first prior art video encoder using syndrome coding.
Figure 4:
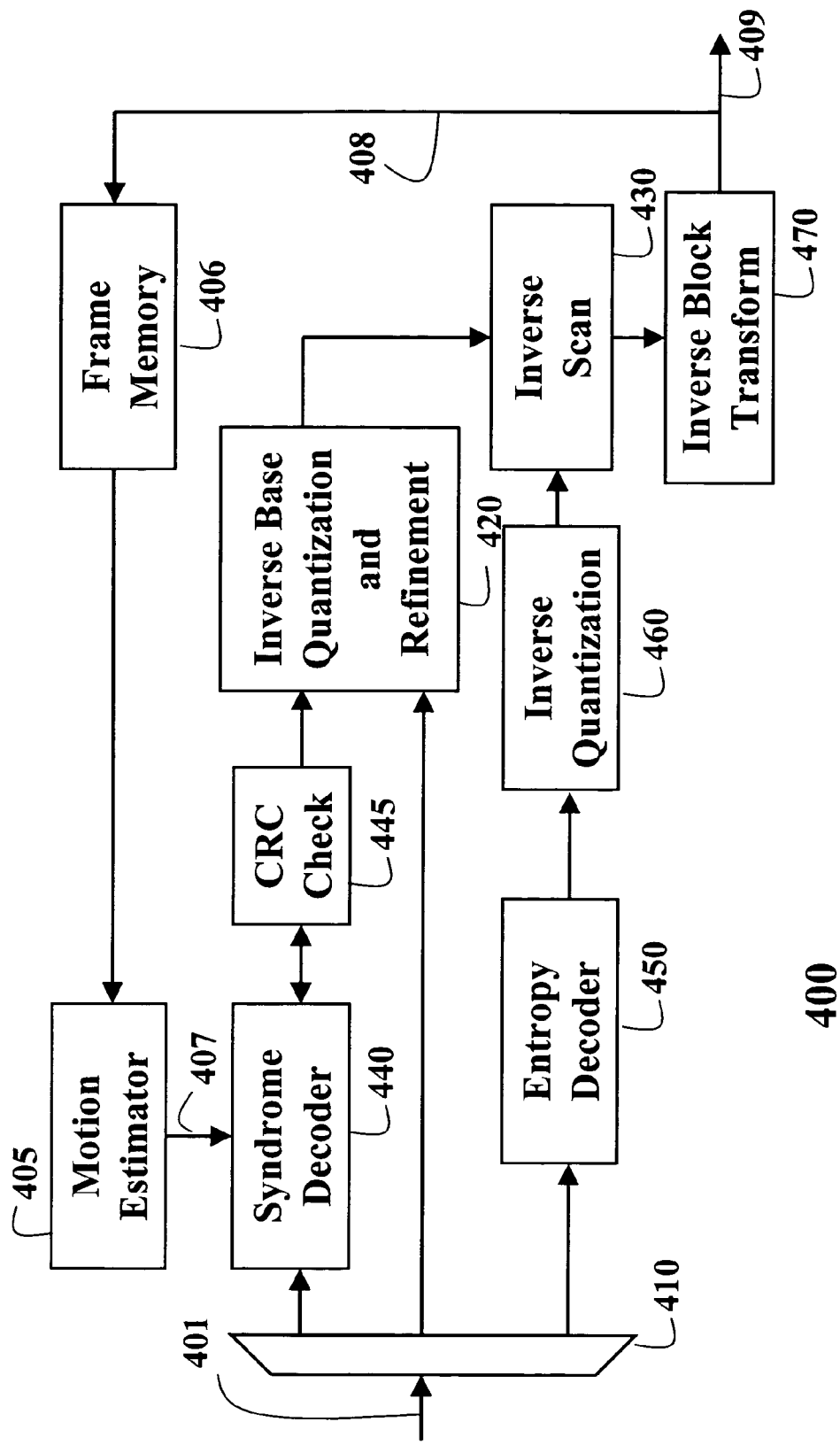
FIG. 4 is a block diagram of a first prior art video decoder corresponding to the encoder of FIG. 3.

In contrast to the prior art systems, the system described in this invention has significant differences and advantages. In the PRISM system of Puri and Ramchandran shown in FIGS. 3 and 4, a large number of high-frequency components are encoded by conventional intra-coding techniques, and syndrome coding is done only on the much smaller number of low-frequency components. This wastes time, storage and bandwidth.

In contrast, our system encodes images by only considering low frequency components, and uses syndrome coding of high and low frequency components of the input image to reconstruct high quality images during the decoding.

Furthermore, in the system by Puri and Ramchandran, syndrome and CRC bits are used to determine a best candidate predictor, i.e., to perform the motion estimation. In that way, the syndrome decoding and motion estimation process are integrated.

In our system, a correspondence between coarse quality images is used to improve evidence used for syndrome decoding. As such, the motion estimation and syndrome decoding are independent processes in our current system.

Figure 5:
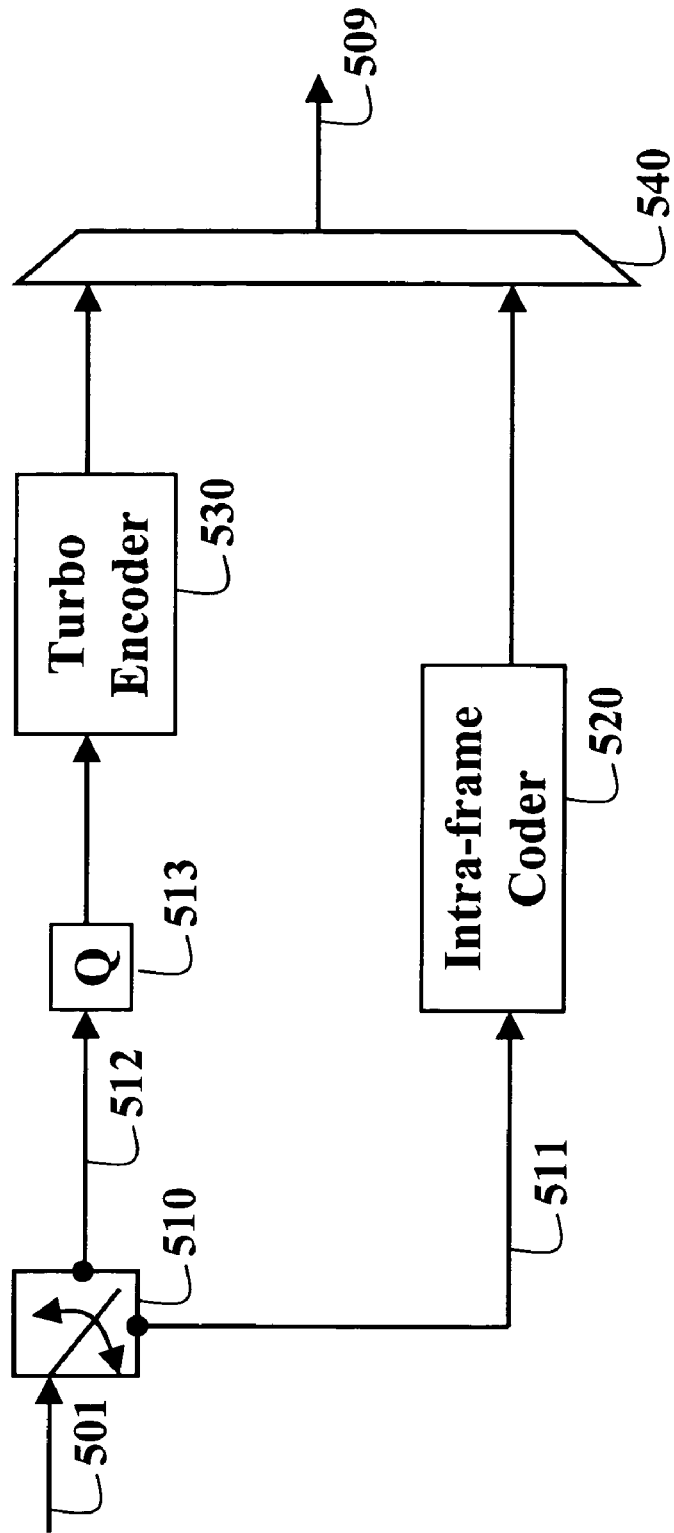
FIG. 5 is a block diagram of a second prior art video encoder using syndrome coding.
Figure 6:
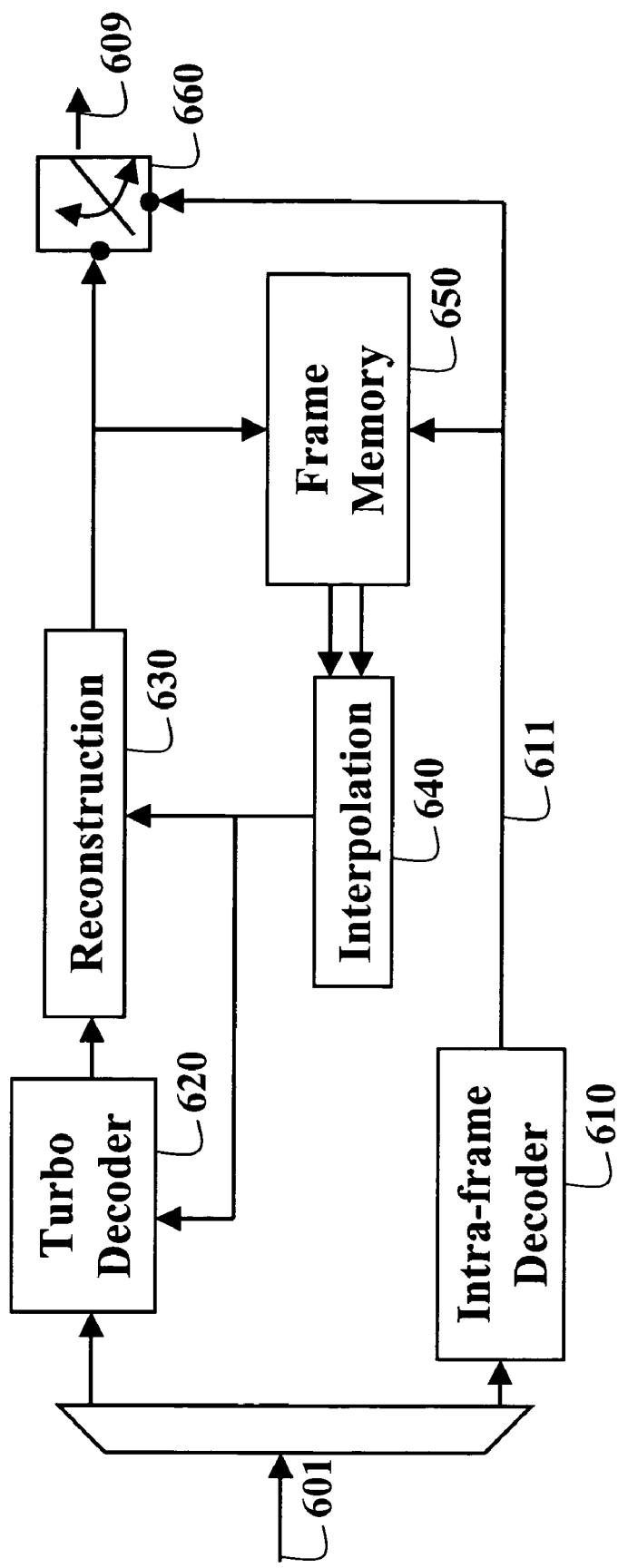
FIG. 6 is a block diagram of a second prior art video decoder corresponding to the video encoder of FIG. 5.

In Aaron et al., as shown in FIGS. 5 and 6, key frames are transmitted to the decoder at regularly spaced intervals of time and syndrome decoding is applied to recover frames in-between these key frames. Our system transmits coarse quality images at each time instant. This overcomes the delay and overhead incurred in sending periodically spaced images. Furthermore, our motion estimation is more precise in establishing a correspondence with previously decoded high-quality reference images, thereby improving the prediction and lowering the rate required for syndrome bits.

It is to be understood that various other adaptations and modifications can be made within the spirit and scope of the invention. Therefore, it is the object of the appended claims to cover all such variations and modifications as come within the true spirit and scope of the invention.

We claim:

1. A method for representing a correlated set of images, comprising the steps of:
   applying, in an encoder, a lossy operation to each image in the correlated set to generate a coarse image, wherein the lossy operation is a coarse quantization;
   encoding, in the encoder, losslessly the coarse image to yield an encoded coarse image;
   representing, in the encoder, independently each image in the correlated set as syndrome bits;
   decoding, in a decoder, the encoded coarse image to obtain a decoded coarse image;
   determining, in the decoder, evidence from pixels in the decoded coarse image, wherein the evidence includes a pixel intensity and a probability distribution of the pixel intensity for each pixel, and wherein the evidence is determined in a pixel domain;
   estimating motion, in the decoder, between the decoded coarse image and previously decoded images to improve the evidence;
   estimating, in the decoder, a reconstructed image based on the syndrome bits and the evidence using probabilistic inference; and
   storing, in the decoder, the reconstructed image as a previously decoded image.

2. The method of claim 1, in which the pixel intensity of the evidence is determined from the decoded coarse image.

3. The method of claim 1, in which the pixel intensity of the evidence is determined from the decoded coarse image and previously decoded images.

4. The method of claim 1, in which the coarse quantization is applied to pixel values of the image.

5. The method of claim 1, in which the coarse quantization is applied to transform coefficients of the image.

6. The method of claim 1, further comprising:
   applying sub-sampling to the image to generate the coarse image.

7. The method of claim 1, further comprising:
   applying a wavelet transform to the image to generate the coarse image.

8. The method of claim 1, in which the correlated set of images is a video.

9. The method of claim 1, in which the correlated set of images are stereo images.

10. The method of claim 1, in which the coarse image is based on only low frequency components of the image, and the syndrome bits are based on low frequency components and high frequency components of the image.

11. The method of claim 1, further comprising:
    applying a finite-impulse response filter with a low-pass frequency response to the image to generate the coarse image.

12. The method of claim 1, further comprising:
    applying an intra-frame encoder with a coarse quantization scale to the input image to generate the coarse image.

13. The method of claim 12, in which the quantization scale is greater than twenty.

14. The method of claim 1, in which a peak signal-to-noise ratio of the coarse image is less than thirty dB.

15. The method of claim 1, further comprising:
    classifying each image to determine a target bit rate at which a syndrome encoder operates to generate the syndrome bits.

16. The method of claim 1 in which the image includes a plurality of blocks, and further comprising:
    classifying each block to determine whether the block can be skipped in the representation.

17. The method of claim 1, further comprising:
    receiving feedback from a decoder operating on previously decoded coarse images and syndrome bits to determine a number of syndrome bits for a current image to represent.

18. The method of claim 1, in which the images are temporally correlated, and further comprising:
    selecting previously decoded images; and
    estimating, in a decoder, motion between a current encoded coarse image and the selected previously decoded images to improve the evidence.

19. The method of claim 18, in which the selecting and estimating is performed on a per block basis.

20. The method of claim 18, in which the selecting and estimating is performed on a per pixel basis.

21. The method of claim 18, in which the previously decoded images include reconstructed images.

22. The method of claim 18, in which the estimating generates motion vectors.

23. The method of claim 22, in which the motion vectors are regularized.

24. The method of claim 18, further comprising:
    determining a sum of absolute differences between the current encoded image and the selected previously decoded images.

25. The method of claim 18, in which the selecting includes searching the selected previously decoded images.

26. The method of claim 22, in which the evidence is improved by means of a motion-compensated evidence enhancer and the motion vectors.

27. The method of claim 18, in which the probability distribution is a Gaussian distribution, including a mean and a variance of each pixel.

28. The method of claim 1, in which the images are spatially correlated, and further comprising:
    estimating a disparity between a current encoded coarse image and the selected previously decoded images to improve the evidence.

29. The method of claim 1, in which the syndrome bits are generated using serially concatenated accumulate codes.

30. The method of claim 1, in which the syndrome bits are bit-plane decoded.

31. The method of claim 18, in which the previously decoded images include decoded coarse images.

32. The method of claim 18, in which the previously decoded images include decoded coarse images and reconstructed images.

33. A system for representing a correlated set of images, comprising:
    means for applying a lossy operation to each image in the correlated set to generate a coarse image;

an encoder configured to encode losslessly the coarse image to yield an encoded coarse image and to represent independently each image in the correlated set as syndrome bits;

a combiner configured to combine the encoded coarse images and the syndrome bits to represent the correlated set of images; and an intra-frame decoder configured to decode the encoded coarse image to obtain a decode coarse image;

means for determining evidence from pixels in the decoded coarse image, wherein the evidence is determined in a pixel domain and includes a pixel intensity and a probability distribution of the pixel intensity for each pixel;

means for estimating a reconstructed image based on the syndrome bits and the evidence using probabilistic inference; and means for storing the reconstructed image as a previously decoded image; and a syndrome decoder configured to decode the syndrome bits according to the evidence to reconstruct the correlated set of images.

34. A method for representing a correlated set of images, comprising:

receiving, in a decoder, a bitstream representing a correlated set of images, in which the bitstream includes encoded coarse images corresponding to the correlated set of images and syndrome bits obtained from the correlated set of images;

decoding the encoded coarse images to obtain decoded coarse images;

decoding the syndrome bits, using the decoded coarse images, to obtain evidence, wherein the evidence is determined in a pixel domain and includes a pixel intensity and a variance of the pixel intensity of each pixel in each decoded coarse image; and estimating a reconstructed set of images corresponding to the correlated set of images, using the evidence and the decoded coarse images.

* * * * *